US009725632B2

(12) United States Patent
Ueno et al.

(10) Patent No.: US 9,725,632 B2
(45) Date of Patent: Aug. 8, 2017

(54) COMPOSITION FOR HEAT CYCLE SYSTEM, AND HEAT CYCLE SYSTEM

(71) Applicant: ASAHI GLASS COMPANY, LIMITED, Chiyoda-ku (JP)

(72) Inventors: Katsuya Ueno, Chiyoda-ku (JP);
Katsuya Fujii, Chiyoda-ku (JP);
Hiroshi Yamamoto, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/253,040

(22) Filed: Aug. 31, 2016

(65) Prior Publication Data

US 2016/0369146 A1 Dec. 22, 2016

Related U.S. Application Data

(63) Continuation of application No. PCT/JP2015/057902, filed on Mar. 17, 2015.

(30) Foreign Application Priority Data

Mar. 18, 2014 (JP) ................. 2014-054590
Jun. 20, 2014 (JP) ................. 2014-127746
Jul. 18, 2014 (JP) ................. 2014-148349

(51) Int. Cl.
*C09K 5/04* (2006.01)
*F25B 1/00* (2006.01)
*C10M 171/00* (2006.01)
*F25B 31/00* (2006.01)
*F25B 43/00* (2006.01)
*F25B 25/00* (2006.01)

(52) U.S. Cl.
CPC ......... *C09K 5/045* (2013.01); *C10M 171/008* (2013.01); *F25B 1/00* (2013.01); *F25B 31/002* (2013.01); *F25B 43/00* (2013.01); *C09K 2205/122* (2013.01); *C09K 2205/126* (2013.01); *C09K 2205/22* (2013.01); *C10M 2209/1055* (2013.01); *C10M 2223/04* (2013.01); *C10M 2223/041* (2013.01); *C10N 2230/02* (2013.01); *C10N 2230/70* (2013.01); *C10N 2240/30* (2013.01); *F25B 25/005* (2013.01); *F25B 2339/047* (2013.01); *F25B 2400/121* (2013.01); *F25B 2500/14* (2013.01); *F25B 2500/222* (2013.01)

(58) Field of Classification Search
CPC .......... C09K 2205/00; C09K 2205/122; C09K 2205/34; C09K 2205/22; C09K 5/04; C09K 5/044; C09K 5/045
USPC .............................. 252/67, 68, 69
See application file for complete search history.

(56) References Cited

U.S. PATENT DOCUMENTS

| 9,493,694 B2* | 11/2016 | Kaneko ................ C09K 5/045 |
| 2009/0143604 A1 | 6/2009 | Nappa et al. |
| 2010/0090156 A1* | 4/2010 | Nappa ................... C09K 5/045 252/74 |
| 2012/0083619 A1 | 4/2012 | Nappa et al. |
| 2012/0132848 A1* | 5/2012 | Sawada ................. C09K 5/045 252/68 |
| 2012/0168672 A1 | 7/2012 | Nappa et al. |
| 2014/0070132 A1 | 3/2014 | Fukushima |
| 2014/0331697 A1 | 11/2014 | Minor et al. |
| 2015/0033770 A1 | 2/2015 | Minor et al. |
| 2015/0337191 A1* | 11/2015 | Fukushima ............ C09K 5/045 62/324.1 |
| 2015/0376486 A1* | 12/2015 | Hashimoto ............ C09K 5/045 252/67 |
| 2016/0075927 A1* | 3/2016 | Fukushima ............ C09K 5/045 252/68 |
| 2016/0333241 A1* | 11/2016 | Fukushima ............ C09K 5/045 |
| 2016/0333242 A1* | 11/2016 | Fukushima ............ C09K 5/045 |
| 2016/0333244 A1* | 11/2016 | Fukushima ............ C09K 5/045 |
| 2016/0333245 A1* | 11/2016 | Fujii ..................... C10M 171/00 |
| 2016/0340565 A1* | 11/2016 | Tasaka ................... C09K 5/045 |
| 2016/0347979 A1* | 12/2016 | Okamoto ............... C09K 5/045 |
| 2016/0347980 A1* | 12/2016 | Okamoto ............... C09K 5/045 |
| 2016/0347982 A1* | 12/2016 | Fukushima ............ C09K 5/045 |
| 2016/0355717 A1* | 12/2016 | Fukushima ............ C09K 5/045 |
| 2016/0355719 A1* | 12/2016 | Fukushima ............ C09K 5/045 |
| 2017/0002244 A1* | 1/2017 | Fukushima ........ C10M 171/008 |
| 2017/0002245 A1* | 1/2017 | Fukushima .............. C09K 5/04 |
| 2017/0015935 A1* | 1/2017 | Takahashi .......... C10M 171/008 |

FOREIGN PATENT DOCUMENTS

| JP | 2012-505296 | 3/2012 |
| WO | WO 2012/157764 A1 | 11/2012 |
| WO | WO 2013/122892 A1 | 8/2013 |

OTHER PUBLICATIONS

International Search Report issued Jun. 2, 2015 in PCT/JP2015/057902, filed on Mar. 17, 2015.

* cited by examiner

Primary Examiner — Douglas McGinty
(74) Attorney, Agent, or Firm — Oblon, McClelland, Maier & Neustadt, L.L.P.

(57) ABSTRACT

A composition for a heat cycle system having less influence over the ozone layer, a low global warming potential, and excellent stability and durability is provided. A heat cycle system using the composition is also provided. The composition contains a working fluid and a phosphoric acid ester. The working fluid contains trifluoroethylene and difluoromethane. An interaction distance (Ra) between the working fluid and the phosphoric acid ester as determined from the Hansen solubility parameters is at most 15.

12 Claims, 1 Drawing Sheet

COMPOSITION FOR HEAT CYCLE SYSTEM, AND HEAT CYCLE SYSTEM

TECHNICAL FIELD

The present invention relates to a composition for a heat cycle system, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used. However, although HFCs have less influence over the ozone layer, it is pointed out that they may cause global warming since they have a high global warming potential (hereinafter referred to as GWP). Accordingly, as a working fluid for a heat cycle system, development of a working fluid having little influence over the ozone layer and having a low GWP is urgently needed.

In recent years, as a working fluid for a heat cycle system, a hydrofluoroolefin (HFO) having a carbon-carbon double bond which is likely to be decomposed by OH radicals in the air and thereby having less influence over the ozone layer, and having a low GWP, has been proposed.

As a working fluid employing such a HFO, for example, Patent Document 1 discloses a technique relating to a working fluid using 1,1,2-trifluoroethylene (HFO-1123) which has the above properties and with which excellent cycle performance will be obtained. Patent Document 1 also discloses an attempt to obtain a working fluid comprising HFO-1123 and various HFCs or HFOs in combination for the purpose of increasing the flame retardancy, cycle performance, etc. of the working fluid.

However, HFO-1123 may undergo self-decomposition reaction under high temperature and high pressure conditions, and if a composition containing HFO-1123 is practically used, improvement of durability of a working fluid using HFO-1123 should be achieved.

Further, HFO-1123 is a compound having an unsaturated bond in its molecule and is a compound having a very short life in the air, and accordingly under conditions under which compression and heating are repeatedly carried out in a heat cycle, it is inferior in the stability to saturated HFCs and HCFCs which are conventional HFCs and HCFCs in some cases.

Under these circumstances, a method for efficiently operating a heat cycle system employing HFO-1123 as a working fluid, with improved stability while excellent cycle performance of HFO-1123 is sufficiently made use of, has been desired.

PRIOR ART DOCUMENT

PATENT DOCUMENT

Patent Document 1: WO2012/157764

DISCLOSURE OF INVENTION

Technical Problem

The object of the present invention is to provide a composition for a heat cycle system which has less influence over the ozone layer, which has a low GWP and which is excellent in the stability and durability, and a heat cycle system.

Solution To Problem

The present invention provides a composition for a heat cycle system, and a heat cycle system of the following [1] to [12].

[1] A composition for a heat cycle system, which comprises a working fluid containing trifluoroethylene and difluoromethane, and a phosphoric acid ester, wherein the interaction distance (Ra) between the working fluid and the phosphoric acid ester as determined from the Hansen solubility parameters is at most 15.

[2] The composition for a heat cycle system according to [1], wherein the content of the phosphoric acid ester is from 0.01 to 10 mass % based on the working fluid (100 mass %).

[3] The composition for a heat cycle system according to [1] or [2], wherein the phosphoric acid ester is a phosphoric acid triester, an acidic phosphoric acid monoester or an acidic phosphoric acid diester.

[4] The composition for a heat cycle system according to [3], wherein the phosphoric acid triester is a trialkyl phosphate or a triaryl phosphate.

[5] The composition for a heat cycle system according to [3], wherein the acidic phosphoric acid monoester is a monoalkyl acid phosphate or a monoaryl acid phosphate.

[6] The composition for a heat cycle system according to [3], wherein the acidic phosphoric acid diester is a dialkyl acid phosphate or a diaryl acid phosphate.

[7] The composition for a heat cycle system according to any one of [1] to [6], wherein the mass ratio (trifluoroethylene/difluoromethane) of trifluoroethylene to difluoromethane in the working fluid is from 1/99 to 99/1.

[8] The composition for a heat cycle system according to any one of [1] to [7], wherein the working fluid further contains at least one hydrofluoroolefin selected from 2,3,3,3-tetrafluoropropene and 1,3,3,3-tetrafluoropropene.

[9] The composition for a heat cycle system according to [8], wherein the working fluid contains trifluoroethylene, difluoromethane and 2,3,3,3-tetrafluoropropene, and the proportions of trifluoroethylene, difluoromethane and 2,3,3, 3-tetrafluoropropene based on the total amount of such three components are as follows:

10 mass %≤trifluoroethylene<75 mass %
5 mass %≤difluoromethane≤75 mass %
0 mass %≤2,3,3,3-tetrafluoropropene≤50 mass %

[10] The composition for a heat cycle system according to [8], wherein the working fluid contains trifluoroethylene, difluoromethane and 1,3,3,3-tetrafluoropropene, and the proportions of trifluoroethylene, difluoromethane and 1,3,3,3-tetrafluoropropene based on the total amount of such three components are as follows:

10 mass %≤trifluoroethylene≤80 mass %
5 mass %≤difluoromethane≤80 mass %
5 mass %≤1,3,3,3-tetrafluoropropene≤45 mass %

[11] A heat cycle system, which employs the composition for a heat cycle system as defined in any one of [1] to [10].

[12] The heat cycle system according to [11], which is a refrigerating apparatus, an air-conditioning apparatus, a power generation system, a heat transport apparatus or a secondary cooling machine.

Advantageous Effects Of Invention

The composition for a heat cycle system of the present invention has less influence over the ozone layer, has a low GWP and is excellent in the stability and durability.

Further, the heat cycle system of the present invention, which employs the composition for a heat cycle system of the present invention, has less influence over the ozone layer, has a low GWP, and is excellent in the stability and durability.

DESCRIPTION OF EMBODIMENT

In this specification, GWP is a value (100 years) in Intergovernmental Panel on Climate Change (IPCC), Fourth assessment report (2007), or a value measured in accordance therewith.

[Composition for Heat Cycle System]

The composition for a heat cycle system of the present invention comprises a working fluid containing trifluoroethylene (HFO-1123) and difluoromethane (HFC-32) and a specific phosphoric acid ester and as the case requires, may further contain a lubricating oil, a stabilizer, a leak detecting substance, etc.

As a heat cycle system to which the composition for a heat cycle system of the present invention is applied, a heat cycle system by a heat exchanger such as a condenser or an evaporator may be used without any particular restriction. The heat cycle system, for example, a refrigerating cycle system, has a mechanism in which a gaseous working fluid gas is compressed by a compressor and cooled by a condenser to form a high pressure liquid, the pressure of the liquid is lowered by an expansion valve, and the liquid is vaporized at low temperature by an evaporator so that heat is removed by the heat of vaporization.

When HFO-1123 is used by itself as a working fluid for such a heat cycle system, HFO-1123 may undergo self-decomposition reaction under specific temperature conditions or pressure conditions. The composition for a heat cycle system of the present invention, which comprises HFC-32 and a specific phosphoric acid ester in combination, can exhibit cycle performance over a long period of time while self-decomposition reaction of HFO-1123 is suppressed.

Now, components contained in the composition for a heat cycle system of the present invention will be described.

<Working Fluid>

The working fluid in the present invention contains HFO-1123 and HFC-32 and may further contain another compound as the case requires.

HFO-1123 is known to undergo chain self-decomposition reaction involving a rapid temperature and pressure increase at high temperature or with an ignition source under high pressure. In the present invention, the working fluid is a mixture of HFO-1123 with HFC-32 with a lowered content of HFO-1123, whereby the self-decomposition reaction can be prevented.

In a case where the working fluid for heat cycle of the present invention is applied to a heat cycle system, the pressure conditions are usually at a level of 5.0 MPa or lower. Accordingly, by the working fluid for heat cycle comprising HFO-1123 and HFC-32 having no self-decomposition property under a pressure of 5.0 MPa, a working fluid with high stability under conventional temperature conditions when applied to a heat cycle system, can be obtained.

Further, considering a case where a contingency such as a breakdown of a heat cycle system apparatus arises, by the composition having no self-decomposition property under a pressure of about 7.0 MPa, a working fluid with higher stability can be obtained.

The working fluid in the present invention, even having a composition with self-decomposition property, may be used for a heat cycle system with careful handling depending upon the conditions of use.

The mass ratio (HFO-1123/HFC-32) of HFO-1123 to HFC-32 in the working fluid is preferably from 1/99 to 99/1 in view of a low GWP of the working fluid and an excellent cycle performance, and with a view to suppressing self-decomposition reaction of HFO-1123 and in view of excellent compatibility with the phosphoric acid ester, it is more preferably from 10/90 to 60/40, particularly preferably from 20/80 to 50/50.

HFO-1123 and HFC-32 form a pseudoazeotropic mixture in an optional range. Accordingly, the working fluid in the present invention has a very small temperature glide. Here, the temperature glide is an index to a difference of the composition between a liquid phase and a gaseous phase of a working fluid in the form of a mixed working fluid. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture with a large temperature glide. Accordingly, when a mixture is used as a working fluid, a working fluid with an appropriate temperature glide is desired.

Further, with a pseudoazeotropic mixture, even if the working fluid leaks out from the heat cycle system, a recovery of the working fluid composition to an initial state will easily be achieved without change of the working fluid composition in the heat cycle system.

In the working fluid (100 mass %) in the present invention, the total content of HFO-1123 and HFC-32 is preferably at least 70 mass %, more preferably at least 80 mass %, particularly preferably at least 90 mass %. If the total content of HFO-1123 and HFC-32 is within the above range, a working fluid with a very small composition change, with a small temperature glide and with an excellent balance of properties such as GWP will be obtained.

GWP of the working fluid as a whole containing HFO-1123 (GWP: 0.3) and HFC-32 (GWP: 675) is preferably at most 400, more preferably at most 385, particularly preferably at most 340 in view of the influence over global warming. GWP of a mixture is represented by a weighted average by the composition mass.

The working fluid in the present invention may contain a compound commonly used as a working fluid, other than HFO-1123 and HFC-32, within a range not to impair the effects of the present invention. Such another compound may, for example, be a HFC other than HFC-32, a HFO (a HFC having a carbon-carbon double bond) other than HFO-1123, or another component which is vaporized and liquefied together with HFO-1123 and HFC-32. Such another compound is preferably a HFC other than HFC-32 and a HFO other than HFO-1123. In a case where the working fluid in the present invention contains another compound, the content of such another compound is preferably at most 30 mass %, more preferably at most 20 mass %, particularly preferably at most 10 mass %. However, the contents of the after-mentioned HFO-1234yf and HFO-1234ze(Z, E) are not limited to the above range.

A HFC other than HFC-32 is preferably a $C_{1-5}$ HFC in view of less influence over the ozone layer and a low GWP. The HFC may be linear, branched or cyclic.

The HFC other than HFC-32 may, for example, be difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent cycle performance, preferred is 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, and more preferred is HFC-32, HFC-152a, HFC-134a or HFC-125. The HFC may be used alone or in combination of two or more.

As the HFO other than HFO-1123, the HFO as an optional component other than HFO-1123 is also preferably selected from the same viewpoint as the above HFC. Here, GWP of the HFO even other than HFO-1123 is an order of magnitude lower than the HFC. Accordingly, as the HFO other than HFO-1123 used in combination with HFO-1123 is preferably selected properly particularly with a view to improving the cycle performance as the working fluid and maintaining the temperature glide within an appropriate range, rather than considering GWP.

The HFO other than HFO-1123 may, for example, be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), 1,2,3,3,3-pentafluoropropene (HFO-1225ye), 1,3,3,3-tetrafluoropropene (HFO-1234ze) or 3,3,3-trifluoropropene (HFO-1243zf).

Stereoisomers of cis-form (Z-form) and trans-form (E-form) are present for each of HFO-1225ye and HFO-1234ze, and in the following, in a case where these forms are to be distinguished, they are represented as HFO-1225ye(Z), HFO-1225ye(E), HFO-1234ze(Z) and HFO-1234ze(E). When these forms are not distinguished and may be in a mixture, they may be sometimes represented as (Z, E).

Particularly, the HFO other than HFO-1123 is, in view of a high critical temperature and excellent durability and cycle performance, preferably HFO-1234yf (GSP:4), HFO-1234ze(E) or HFO-1234ze(Z) (GSPs of both (E)-form and (Z)-form being 6), more preferably HFO-1234yf. The HFO other than HFO-1123 may be used alone or in combination of two or more.

Another compound which is vaporized and liquefied together with HFO-1123 and HFC-32 may, for example, be carbon dioxide, a hydrocarbon, a chlorofluoroolefin (CFO) or a hydrochlorofluoroolefin (HCFO).

The hydrocarbon may, for example, be propane, propylene, cyclopropane, butane, isobutane, pentane or isopentane. The hydrocarbon may be used alone or in combination of two or more. In a case where the working fluid contains the hydrocarbon, its content is less than 10 mass %, preferably from 1 to 5 mass %, more preferably from 3 to 5 mass % per 100 mass % of the working fluid. When the content of the hydrocarbon is at least the lower limit, the compatibility of a mineral lubricating oil with the working fluid will be more favorable.

The CFO may, for example, be chlorofluoropropene or chlorofluoroethylene, and with a view to suppressing flammability of the working fluid without significantly decreasing the cycle performance of the working fluid, it is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112). The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122). The HCFO may be used alone or in combination of two or more.

In a case where the working fluid contains the HCFO, the content of the HCFO per 100 mass % of the working fluid is less than 1 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid in the present invention contains HFO-1123, HFO-1234yf and HFC-32, preferred is the following composition range.

10 mass % ≤ HFO-1123 < 75 mass %
0 mass % < HFO-1234yf ≤ 50 mass %
5 mass % ≤ HFC-32 ≤ 75 mass %

Further, in a case where the working fluid in the present invention contains HFO-1123, HFO-1234yf and HFC-32, a preferred composition range (P) is shown below.
<Composition Range (P)>
70 mass %≤HFO-1123+HFO-1234yf
30 mass %≤HFO-1123≤80 mass %
HFO-1234yf≤40 mass %
5 mass %≤HFC-32≤30 mass %
HFO-1123/HFO-1234yf≤95/5 mass %

The working fluid in the above composition is a working fluid having respective characteristics of HFO-1123, HFO-1234yf and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained.

As a more preferred composition of the working fluid in the present invention, a composition containing HFO-1123 in a proportion of from 30 to 70 mass %, HFO-1234yf in a proportion of from 4 to 40 mass % and HFC-32 in a proportion of from 5 to 30 mass % based on the total amount of HFO-1123, HFO-1234yf and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is more preferably at least 8 mass %.

Further, in another preferred composition in a case where the working fluid in the present invention contains HFO-1123, HFO-1234yf and HFC-32, the content of HFO-1123 based on the entire amount of the working fluid is at most 70 mol %. Within such a range, self-decomposition reaction of HFO-1123 is suppressed, and a working fluid having high durability can be obtained.

Within the above another preferred composition, a more preferred composition range (R) will be described below.
<Composition Range (R)>
10 mass %≤HFO-1123<70 mass %
0 mass %<HFO-1234yf≤50 mass %
30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A preferred range of the working fluid in the composition range (R) will be described below.
20 mass %≤HFO-1123<70 mass %
0 mass %<HFO-1234yf≤40 mass %
30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

A more preferred composition range of the working fluid in the above composition range (R) will be described below.
<Composition Range (L)>
20 mass %≤HFO-1123<70 mass %
0 mass %<HFO-1234yf≤40 mass %
30 mass %≤HFC-32≤44 mass %

The following composition range is more preferred.
<Composition Range (M)>
20 mass %≤HFO-1123<70 mass %
5 mass %≤HFO-1234yf≤40 mass %
30 mass %≤HFC-32≤44 mass %

A working fluid in a more preferred composition range in the above composition range (R) is a working fluid having respective characteristics of HFO-1123, HFO-1234yf and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained. Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234yf. Further, in view of a high relative refrigerating capacity, more preferably HFO-1234yf≤35 mass %.

In a case where the working fluid in the present invention contains HFO-1123, HFO-1234ze and HFC-32, a preferred composition range (W) will be described below.
<Composition Range (W)>
10 mass %≤HFO-1123≤80 mass %
5 mass %≤HFC-32≤80 mass %
5 mass %≤HFO-1234ze≤45 mass %

The working fluid in the above composition is a working fluid having respective characteristics of HFO-1123, HFO-1234ze and HFC-32 in a balanced manner, and having defects of the respective components suppressed. That is, the working fluid is a working fluid which has a low GWP, which has durability secured, and which has a smaller temperature glide and has higher performance and efficiency when used for heat cycle, and thus with such a working fluid, favorable cycle performance will be obtained.

<Phosphoric Acid Ester>

The phosphoric acid ester in the present invention is characterized in that the interaction distance (Ra) to the working fluid as determined from the Hansen solubility parameters (hereinafter sometimes referred to as HSP) is at most 15. In this specification, HSP are represented by three parameters $\delta_D$, $\delta_P$ and $\delta_H$, each measured in the unit (MPa)$^{1/2}$, based on solubility parameters developed by Hildebrand, under a condition that the following formula (1) is satisfied. $\delta_D$ is HSP by an effect from dispersion forces between molecules, $\delta_P$ is HSP by an effect from dipolar intermolecular force between molecules, and $\delta_H$ is HSP by an effect from hydrogen bonds between molecules.

$$\delta^2 = \delta_D^2 + \delta_P^2 + \delta_H^2 \quad (1)$$

In this specification, the interaction distance (Ra) between two substances is a value calculated in accordance with the following formula (2):

$$(Ra) = \{(2\delta_{D1} - 2\delta_{D2})^2 + (\delta_{P1} - \delta_{P2})^2 + (\delta_{H1} - \delta_{H2})^2\}^{1/2} \quad (2)$$

In the formula (2), the subscripts 1 and 2 respectively represent the HSP of the substance 1 and the substance 2.

The definition and the calculation method of HSP and the interaction distance are disclosed in the following article.

Charles M. Hansen, Hansen Solubility Parameters: A Users Handbook (CRC Press, 2007)

According to the article, HSP of a mixture are determined from HSP of substances mixed and the volume mixture ratio in accordance with the following formulae (3) to (5).

$$\delta_{D,MIX} = (\delta_{D1} \times \phi_1) + (\delta_{D2} \times \phi_2) \quad (3)$$

$$\delta_{P,MIX} = (\delta_{P1} \times \phi_1) + (\delta_{P2} \times \phi_2) \quad (4)$$

$$\delta_{H,MIX} = (\delta_{H1} \times \phi_1) + (\delta_{H2} \times \phi_2) \quad (5)$$

In the formulae (3) to (5), $\phi$ represents the volume fraction at the time of mixing, and the subscripts 1, 2 and MIX respectively represent the substance 1, the substance 2 and the mixture.

In a case where the phosphoric acid ester in this specification is a mixture comprising at least two components, HSP of the phosphoric acid ester are calculated in accordance with the following formula (6) based on the formulae (3) to (5).

$$\delta_{D,MIX} = \sum_{n=1}^{x} (\delta_{D,n} \times \phi_n) \quad (6)$$

$$\delta_{P,MIX} = \sum_{n=1}^{x} (\delta_{P,n} \times \phi_n) \quad (7)$$

$$\delta_{H,MIX} = \sum_{n=1}^{x} (\delta_{H,n} \times \phi_n) \quad (8)$$

In the formulae (6) to (8), $\phi$ represents the volume fraction at the time of mixing, x represents the total number of types of the substances mixed, and the subscripts n and MIX respectively represent the substance n and the mixture.

HSP ($\delta_D$, $\delta_P$ and $\delta_H$) can easily be estimated from the chemical structure by using, for example, computer software Hansen Solubility Parameter in Practice (HSPiP).

In general, ones having HSP close to each other tend to be soluble in each other. From the HSP theory, the present inventors have conducted studies on the relation between a working fluid containing HFO-1123 and HFC-32, and a phosphoric acid ester suitable therefor. As a result, they have found that when a phosphoric acid ester having a short interaction distance to the working fluid in the present invention and having excellent compatibility with the working fluid is used, excellent stability is obtained.

The interaction distance (Ra) between the working fluid and the phosphoric acid ester in the present invention is preferably at most 13, more preferably at most 12, particularly preferably at most 10.

The phosphoric acid ester in the present invention may be properly selected depending upon the composition of the working fluid, so long as the interaction distance (Ra) is at most 15.

The phosphoric acid ester may, for example, be at least one member selected from a phosphoric acid triester, an acidic phosphoric acid monoester, an acidic phosphoric acid diester, a phosphite and an acidic phosphite. The phosphoric acid ester is preferably a phosphoric acid triester, an acidic phosphoric acid monoester or an acidic phosphoric acid diester.

The phosphoric acid ester preferably has a $C_{1-30}$ hydrocarbon group in its molecule. The hydrocarbon group may, for example, be an alkyl group, an alkenyl group, an aryl group or an aralkyl group.

Each of the alkyl group and the alkenyl group may be linear, branched or cyclic, and may, for example, be specifically an ethyl group, a n-propyl group, an isopropyl group, a n-butyl group, an isobutyl group, a sec-butyl group, a tert-butyl group, various forms of a pentyl group, various forms of a hexyl group, various forms of an octyl group, various forms of a decyl group, various forms of a dodecyl group, various forms of a tetradecyl group, various forms of a hexadecyl group, various forms of an octadecyl group, a cyclopentyl group, a cyclohexyl group, an allyl group, a propenyl group, various forms of a butenyl group, various forms of a hexenyl group, various forms of an octenyl group, various forms of a decenyl group, various forms of a dodecenyl group, various forms of a tetradecenyl group, various forms of a hexadecenyl group, various forms of an octadecenyl group, a cyclopentenyl group or a cyclohexenyl group. Further, one or more of hydrogen atoms in an alkyl group may be substituted by a halogen atom such as a chlorine atom.

The aryl group may, for example, be a phenyl group, a tolyl group, a xylyl group or a naphthyl group, and the aralkyl group may, for example, be a benzyl group, a phenethyl group, a naphthylmethyl group, a methylbenzyl group, a methylphenethyl group or a methylnaphthylmethyl group. Further, one or more of hydrogen atoms bonded to the ring of the aryl group or hydrogen atoms out of the ring may be substituted by a halogen atom such as a chlorine atom.

The phosphoric acid triester may, for example, be a trialkyl phosphate, a triaryl phosphate, a trialkyl aryl phosphate, a triaryl alkyl phosphate or a trialkenyl phosphate. The phosphoric acid triester is preferably a trialkyl phosphate or a triaryl phosphate.

Specifically, the phosphoric acid triester may, for example, be trimethyl phosphate, triethyl phosphate, tripropyl phosphate, tributyl phosphate, trihexyl phosphate, tri(2-ethylhexyl) phosphate, tridecyl phosphate, tridodecyl phosphate, tritetradecyl phosphate, trihexadecyl phosphate, trioctadecyl phosphate, trioctadecenyl phosphate, ethyl dibutyl phosphate, triphenyl phosphate, tricresyl phosphate, benzyl diphenyl phosphate, ethyl diphenyl phosphate, cresyl diphenyl phosphate, dicresyl phenyl phosphate, ethylphenyl diphenyl phosphate, di(ethylphenyl) phenyl phosphate, propylphenyl diphenyl phosphate, di(propylphenyl) phenyl phosphate, triethylphenyl phosphate, tripropylphenyl phosphate, butylphenyl diphenyl phosphate, di(butylphenyl) phenyl phosphate or tributylphenyl phosphate.

The acidic phosphoric acid monoester may, for example, be a monoalkyl acid phosphate or a monoaryl acid phosphate. Specifically, it may, for example, be monoethyl acid phosphate, mono-n-propyl acid phosphate, mono-n-butyl acid phosphate, mono-2-ethylhexyl acid phosphate, monododecyl acid phosphate, monotetradecyl acid phosphate, monohexadecyl acid phosphate, monooctadecyl acid phosphate or monooctadecenyl acid phosphate.

The acidic phosphoric acid diester may, for example, be a dialkyl acid phosphate or a diaryl acid phosphate. Specifically, it may, for example, be di-n-butyl acid phosphate, di-2-ethylhexyl acid phosphate, didecyl acid phosphate, didodecyl acid phosphate, di(tridecyl) acid phosphate, dioctadecyl acid phosphate, di-9-octadecenyl acid phosphate, di(4-methylphenyl) acid phosphate or di(4-chlorophenyl) acid phosphate.

The phosphite may, for example, be an acidic phosphorous acid diester or a phosphorous acid triester.

The acidic phosphorous acid diester may, for example, be di-n-butyl hydrogen phosphite, di-2-ethylhexyl hydrogen phosphite, didecyl hydrogen phosphite, didodecyl hydrogen phosphite, dioctadecyl hydrogen phosphite, di-9-octadecenyl hydrogen phosphite, diphenyl hydrogen phosphite, di(4-methylphenyl) hydrogen phosphite or di(4-chlorophenyl) hydrogen phosphite.

Further, the phosphorous acid triester may, for example, be triethyl phosphite, tri-n-butyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite or trioleyl phosphite.

The phosphoric acid ester is preferably a phosphoric acid triester in view of excellent compatibility with the working fluid in the present invention, and is more preferably a $C_{1-4}$ trialkyl phosphate, triphenyl phosphate or tricresyl phosphate.

Further, in a case where the phosphoric acid ester is hydrolyzed to form a compound having a phenol group, an effect of the formed phenol group to trap radicals can be expected, and the obtainable composition for a heat cycle system may have higher stability. In such a viewpoint, the phosphoric acid ester is particularly preferably triphenyl phosphate or tricresyl phosphate.

The phosphoric acid ester may be used alone or in combination of two or more.

The content of the phosphoric acid ester is preferably from 0.01 to 10 mass %, more preferably from 0.05 to 5 mass %, particularly preferably from 0.1 to 3 mass % based on the working fluid (100 mass %). When the content of the phosphoric acid ester is within the above range, excellent compatibility with the working fluid will be obtained without decreasing the cycle performance.

In the composition for a heat cycle system of the present invention, if water or oxygen in the air is included in the heat cycle system, HFO-1123, which has an unsaturated bond in its molecule, may be decomposed to form an acid as a decomposed product.

The phosphoric acid ester in the present invention, which is hydrolyzed by an acid, is considered to trap an acid formed in the heat cycle system thereby to increase the stability of the composition for a heat cycle system. The phosphoric acid ester in the present invention, which is excellent in the compatibility particularly with a working fluid containing HFO-1123 and HFC-32, is considered to effectively improve the stability even when compression and heating are repeatedly carried out.

Further, in a case where the after-described lubricating oil is contained in the heat cycle system, it is possible to prevent baking on a compressor in the heat cycle system due to deterioration of the lubricating oil, thus leading to an improvement in the stability.

<Lubricating Oil>

In the heat cycle system of the present invention, the working fluid may be used as mixed with a lubricating oil. As the, lubricating oil, a known lubricating oil used for a heat cycle system may be employed.

The lubricating oil may, for example, be an oxygen-containing synthetic oil (such as an ester lubricating oil or an ether lubricating oil), a fluorinated lubricating oil, a mineral oil or a hydrocarbon synthetic oil.

As the ester lubricating oil, a dibasic acid ester oil, a polyol ester oil, a complex ester oil, a polyol carbonate ester oil or the like may be mentioned.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol ethanol, propanol, butanol, pentanol, hexanol, heptanol, octanol, nonanol, decanol, undecanol, dodecanol, tridecanol, tetradecanol or pentadecanol). Specifically, preferred is ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or a sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is more preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may, for example, be as mentioned for the dibasic acid ester oil or the polyol ester oil.

The polyol carbonate oil is an ester of carbonic acid and a polyol.

The polyol may be the same diol or polyol as mentioned above. Further, the polyol carbonate oil may be a ring-opening polymer of a cyclic alkylene carbonate.

The ether lubricating oil may, for example, be a polyvinyl ether or a polyoxyalkylene oil.

The polyvinyl ether may be a polymer of a vinyl ether monomer, a copolymer of a vinyl ether monomer and a hydrocarbon monomer having an olefinic double bond, or a copolymer of a vinyl ether monomer and a vinyl ether type monomer having a polyoxyalkylene chain.

The vinyl ether monomer is preferably an alkyl vinyl ether, and its alkyl group is preferably an alkyl group having at most 6 carbon atoms. Further, the vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyoxyalkylene oil may, for example, be a polyoxyalkylene monool, a polyoxyalkylene polyol, an alkyl ether of a polyoxyalkylene monool or polyoxyalkylene polyol, or an ester of a polyoxyalkylene monool or polyoxyalkylene polyol.

The polyoxyalkylene monool or polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyalkylene glycol oil.

The fluorinated lubricating oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral oil may, for example, be a naphthene mineral oil or a paraffin mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be poly-α-olefin, an alkylbenzene or an alkylnaphthalene.

The lubricating oil may be used alone or in combination of two or more.

The lubricating oil is preferably a polyol ester oil and/or a polyglycol oil in view of the compatibility with the working fluid, and is particularly preferably a polyalkylene glycol oil with a view to obtaining a remarkable antioxidant effect by the after-mentioned stabilizer. The kinematic viscosity of the lubricating oil at 40° C. is preferably from 1 to 750 mm$^2$/s, more preferably from 1 to 400 mm$^2$/s. Further, the kinematic viscosity at 100° C. is preferably from 1 to 100 mm$^2$/s, more preferably from 1 to 50 mm$^2$/s.

In the composition for a heat cycle system, the mass ratio of the working fluid to the lubricating oil (working fluid/lubricating oil) should be within a range not to remarkably deteriorate the effects of the present invention and varies depending upon the purpose of application, the form of the compressor, etc., and is preferably from 1/10 to 10/1, more preferably from 1/3 to 3/1, particularly preferably from 2/3 to 3/2.

<Stabilizer>

The stabilizer is a component which improves the stability of the working fluid against heat and oxidation. The stabilizer may, for example, be an oxidation resistance-improving agent, a heat resistance-improving agent or a metal deactivator.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol).

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of the stabilizer is not limited within a range not to remarkably decrease the effects of the present invention, and is usually at most 5 mass %, preferably at most 1 mass % in the composition for a heat cycle system (100 mass %).

The stabilizer may be used alone or in combination of two or more.

<Leak Detecting Substance>

The leak detecting substance may, for example, be an ultraviolet fluorescent dye, an odor gas or an odor masking agent. The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by mass, more preferably at most 0.5 part by mass per 100 parts by mass of the working fluid.

(Function and Effects)

The composition for a heat cycle system of the present invention, which comprises both a working fluid containing HFO-1123 and HFC-32 and a specific phosphoric acid ester, has less influence over the ozone layer, has a low GWP, and is excellent in stability and durability.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerating apparatus, an air-conditioning apparatus, a power generation system, a heat transfer apparatus and a secondary cooling machine.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system. The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Among them, the heat cycle system of the present invention, which efficiently exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

Further, the heat cycle system of the present invention may be a heat transport apparatus. The heat transport apparatus is preferably a latent heat transport apparatus. The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Figure 1:
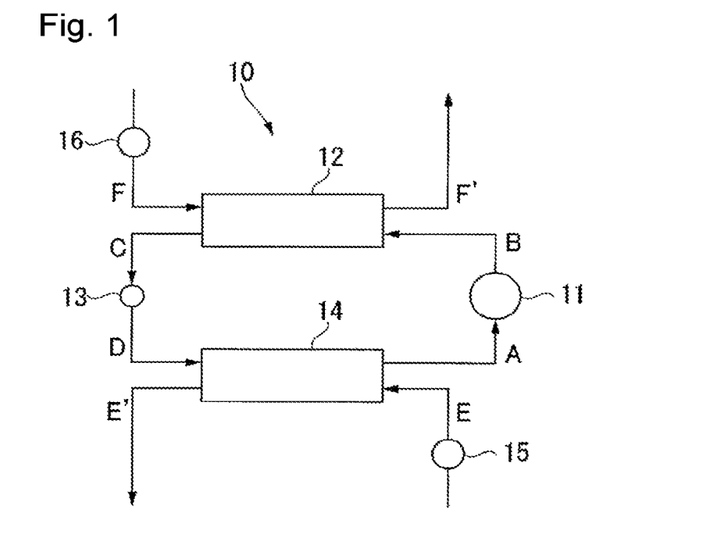
FIG. 1 is a schematic construction view illustrating a refrigerating cycle system as an example of a heat cycle system of the present invention.

Now, as an example of the heat cycle system according the embodiment of the present invention, a refrigerating cycle system will be described with reference to a refrigerating cycle system 10, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A, to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy chart (curve) as shown in FIG. 2, may be represented as a trapezoid having points A, B, C and D as vertexes.

Figure 2:
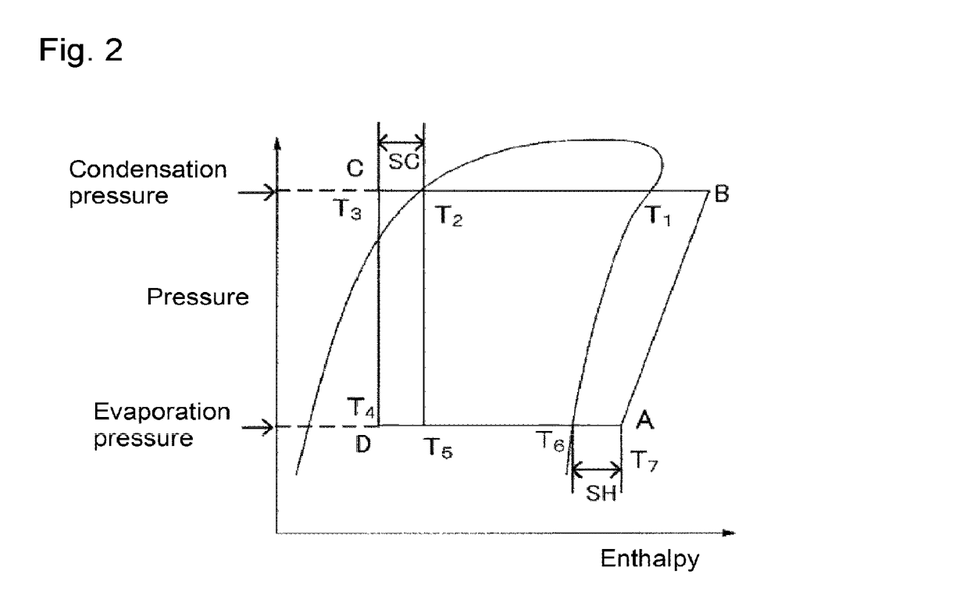
FIG. 2 is a cycle diagram illustrating the state change of a working fluid in a refrigerating cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy chart and the BC line, the intersection point $T_1$ on the high enthalpy side is the condensing temperature, and the intersection point $T_2$ on the low enthalpy side is the condensation boiling point temperature. Here, the temperature glide in a case where a mixed fluid is a non-azeotropic mixture fluid, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (A) and (B) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \quad (A)$$

$$COP = Q/\text{compression work} = (h_A - h_D)/(h_B - h_A) \quad (B)$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

(Moisture Concentration)

A problem such that moisture is included in the heat cycle system may occur. Inclusion of moisture may occur due to freezing in a capillary tube, hydrolysis of the working fluid or the lubricating oil, deterioration of materials by an acid component formed in the cycle, formation of contaminants, etc. Particularly, the above-described polyalkylene glycol oil or polyol ester oil has extremely high moisture absorbing properties and is likely to undergo hydrolysis, and inclusion of moisture decreases properties of the lubricating oil and may be a great cause to impair the long term reliability of a compressor. Further, in an automobile air-conditioning system, moisture tends to be included from a refrigerant hose used for the purpose of absorbing vibration or a bearing of a compressor. Accordingly, in order to suppress hydrolysis of the lubricating oil, it is necessary to control the moisture concentration in the heat cycle system. The moisture concentration in the heat cycle system is preferably less than 10,000 ppm, more preferably less than 1,000 ppm, particularly preferably less than 100 ppm by the mass ratio based on the working fluid.

As a method of controlling the moisture concentration in the heat cycle system, a method of using a desiccating agent (such as silica gel, activated aluminum or zeolite) may be mentioned. The desiccating agent is preferably a zeolite desiccating agent in view of chemical reactivity of the desiccating agent and the working fluid, and the moisture absorption capacity of the desiccating agent.

The zeolite desiccating agent is, in a case where a lubricating oil having a large moisture absorption as compared with a conventional mineral refrigerant oil is used, preferably a zeolite desiccating agent containing a compound represented by the following formula (9) as the main component in view of excellent moisture absorption capacity.

$$M_{2/n}O \cdot Al_2O_3 \cdot xSiO_2 \cdot yH_2O \quad (9)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are particularly important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid for heat cycle. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from 0.5 to 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

(Oxygen Concentration)

Oxygen may be included in the heat cycle system. Since inclusion of oxygen may cause deterioration of the working fluid or the like, it is necessary to keep the oxygen concentration in the heat cycle system low. The oxygen concentration in the heat cycle system is preferably less than 10,000 ppm, more preferably less than 1,000 ppm, particularly preferably less than 100 ppm by the mass ratio based on the working fluid.

(Chlorine Concentration)

If chlorine is present in the heat cycle system, it may have undesirable effects such as formation of a deposit by a reaction with a metal, friction of a bearing, and decomposition of the working fluid or the lubricating oil.

The chlorine concentration in the heat cycle system is preferably at most 100 ppm, particularly preferably at most 500 ppm by the mass ratio based on the working fluid for heat cycle.

(Non-Condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the lubricating oil and promotes their decomposition.

The non-condensing gas concentration is preferably at most 1.5 vol %, particularly preferably at most 0.5 vol % by the volume ratio based on the working fluid, in a gaseous phase of the working fluid.

(Function and Effects)

The above-described heat cycle system, which employs the composition for a heat cycle system of the present invention, has little influence over the ozone layer, has a low GWP and is excellent in stability and durability.

EXAMPLES

<Method for Calculation of Hansen Solubility Parameters (HSP)>

HSP ($\delta_D$, $\delta_P$ and $\delta_H$) of HFO-1123, HFC-32, HFO-1234yf and the phosphoric acid esters were in accordance with computer software Hansen Solubility Parameters in Practice (HSPiP). With respect to substances registered in the database of HSPiP version 4.1.04, the values in the database were employed, and with respect to solvents not registered in the database, values estimated from HSPiP version 4.1.04 were employed.

(Working Fluid)

With respect to working fluids Nos. 1 to 61 containing HFO-1123, HFC-32 and HFO-1234yf in proportions (mass %) as identified in Tables 1 and 2, HSP were determined by the above method. The results are shown in Tables 1 and 2. In Tables 1 and 2, the working fluids Nos and the compositions of the working fluids, and HSP ($\delta_D$, $\delta_P$ and $\delta_H$) of the working fluids are shown.

TABLE 1

| Working fluid No. | Working fluid composition [mass %] | | | $\delta_D$ | $\delta_P$ | $\delta_H$ |
|---|---|---|---|---|---|---|
| | HFO-1123 | HFO-1234yf | HFC-32 | | | |
| 1 | 100 | 0 | 0 | 13.5 | 3.1 | 2.7 |
| 2 | 0 | 0 | 100 | 15.6 | 9.4 | 9.1 |
| 3 | 10 | 0 | 90 | 15.4 | 8.8 | 8.5 |
| 4 | 20 | 0 | 80 | 15.2 | 8.1 | 7.8 |
| 5 | 50 | 0 | 50 | 14.6 | 6.3 | 5.9 |
| 6 | 80 | 0 | 20 | 13.9 | 4.4 | 4.0 |
| 7 | 90 | 0 | 10 | 13.7 | 3.7 | 3.3 |
| 8 | 50 | 10 | 40 | 14.8 | 7.1 | 6.8 |
| 9 | 40 | 20 | 40 | 14.9 | 7.2 | 6.9 |
| 10 | 30 | 30 | 40 | 14.9 | 7.4 | 7.0 |
| 11 | 40 | 10 | 50 | 15.0 | 7.7 | 7.3 |
| 12 | 30 | 20 | 50 | 15.1 | 7.8 | 7.4 |
| 13 | 20 | 30 | 50 | 15.1 | 8.0 | 7.6 |
| 14 | 30 | 10 | 60 | 15.2 | 8.2 | 7.8 |
| 15 | 20 | 20 | 60 | 15.2 | 8.3 | 7.9 |
| 16 | 10 | 30 | 60 | 15.3 | 8.4 | 8.1 |
| 17 | 20 | 10 | 70 | 15.3 | 8.6 | 8.3 |
| 18 | 10 | 20 | 70 | 15.4 | 8.7 | 8.4 |
| 19 | 60 | 30 | 10 | 14.0 | 4.6 | 4.1 |
| 20 | 70 | 20 | 10 | 14.0 | 4.6 | 4.1 |
| 21 | 80 | 10 | 10 | 14.0 | 4.5 | 4.1 |
| 22 | 50 | 30 | 20 | 14.3 | 5.8 | 5.3 |
| 23 | 60 | 20 | 20 | 14.3 | 5.7 | 5.2 |
| 24 | 70 | 10 | 20 | 14.3 | 5.6 | 5.2 |
| 25 | 60 | 10 | 30 | 14.6 | 6.4 | 6.0 |
| 26 | 50 | 20 | 30 | 14.6 | 6.5 | 6.1 |
| 27 | 40 | 30 | 30 | 14.7 | 6.7 | 6.2 |
| 28 | 40 | 5 | 55 | 15.03 | 7.71 | 7.37 |
| 29 | 40 | 15 | 45 | 14.88 | 7.29 | 6.91 |
| 30 | 40 | 25 | 35 | 14.69 | 6.76 | 6.34 |

TABLE 2

| Working fluid No. | Working fluid composition [mass %] | | | $\delta_D$ | $\delta_P$ | $\delta_H$ |
|---|---|---|---|---|---|---|
| | HFO-1123 | HFO-1234yf | HFC-32 | | | |
| 31 | 45 | 5 | 50 | 14.94 | 7.44 | 7.10 |
| 32 | 45 | 10 | 45 | 14.86 | 7.22 | 6.86 |
| 33 | 45 | 15 | 40 | 14.77 | 6.97 | 6.59 |
| 34 | 45 | 20 | 35 | 14.67 | 6.70 | 6.29 |
| 35 | 45 | 25 | 30 | 14.56 | 6.38 | 5.95 |
| 36 | 45 | 30 | 25 | 14.43 | 6.03 | 5.56 |
| 37 | 50 | 5 | 45 | 14.85 | 7.16 | 6.81 |
| 38 | 50 | 15 | 35 | 14.66 | 6.63 | 6.24 |
| 39 | 50 | 25 | 25 | 14.42 | 5.97 | 5.52 |
| 40 | 55 | 5 | 40 | 14.74 | 6.85 | 6.49 |
| 41 | 55 | 10 | 35 | 14.65 | 6.57 | 6.20 |
| 42 | 55 | 15 | 30 | 14.54 | 6.26 | 5.86 |
| 43 | 55 | 20 | 25 | 14.41 | 5.91 | 5.48 |
| 44 | 55 | 25 | 20 | 14.27 | 5.51 | 5.05 |
| 45 | 55 | 30 | 15 | 14.10 | 5.05 | 4.55 |
| 46 | 30 | 25 | 45 | 14.91 | 7.43 | 7.02 |
| 47 | 30 | 15 | 55 | 15.07 | 7.85 | 7.48 |
| 48 | 30 | 5 | 65 | 15.19 | 8.19 | 7.86 |
| 49 | 35 | 30 | 35 | 14.71 | 6.83 | 6.39 |
| 50 | 35 | 25 | 40 | 14.81 | 7.11 | 6.69 |
| 51 | 35 | 20 | 45 | 14.90 | 7.36 | 6.97 |
| 52 | 35 | 15 | 50 | 14.98 | 7.58 | 7.21 |
| 53 | 35 | 10 | 55 | 15.05 | 7.78 | 7.43 |
| 54 | 35 | 5 | 60 | 15.11 | 7.96 | 7.62 |
| 55 | 20 | 40 | 40 | 14.86 | 7.33 | 6.86 |
| 56 | 10 | 50 | 40 | 14.90 | 7.50 | 6.99 |
| 57 | 10 | 40 | 50 | 15.07 | 7.96 | 7.51 |
| 58 | 40 | 50 | 10 | 13.91 | 4.62 | 4.00 |
| 59 | 50 | 40 | 10 | 13.91 | 4.54 | 3.98 |
| 60 | 40 | 40 | 20 | 14.30 | 5.67 | 5.15 |
| 61 | 30 | 40 | 30 | 14.61 | 6.58 | 6.09 |

With respect to working fluids Nos. 62 to 115 containing HFO-1123, HFC-32 and HFO-1234ze in proportions (mass %) as identified in Tables 3 and 4, HSP were determined by the above method. The results are shown in Tables 3 and 4, in the same manner as in Tables 1 and 2.

TABLE 3

| Working fluid No. | Working fluid composition [mass %] | | | $\delta_D$ | $\delta_P$ | $\delta_H$ |
|---|---|---|---|---|---|---|
| | HFO-1123 | HFO-1234ze (Z, E) | HFC-32 | | | |
| 62 | 50 | 10 | 40 | 14.9 | 7.1 | 6.8 |
| 63 | 40 | 20 | 40 | 14.9 | 7.3 | 6.9 |
| 64 | 30 | 30 | 40 | 15.0 | 7.4 | 7.1 |
| 65 | 40 | 10 | 50 | 15.0 | 7.7 | 7.4 |
| 66 | 30 | 20 | 50 | 15.1 | 7.8 | 7.5 |
| 67 | 20 | 30 | 50 | 15.2 | 8.0 | 7.6 |
| 68 | 30 | 10 | 60 | 15.2 | 8.2 | 7.9 |
| 69 | 20 | 20 | 60 | 15.3 | 8.3 | 8.0 |
| 70 | 10 | 30 | 60 | 15.3 | 8.5 | 8.1 |
| 71 | 20 | 10 | 70 | 15.3 | 8.6 | 8.3 |
| 72 | 10 | 20 | 70 | 15.4 | 8.7 | 8.4 |
| 73 | 60 | 30 | 10 | 14.1 | 4.7 | 4.3 |
| 74 | 70 | 20 | 10 | 14.0 | 4.6 | 4.2 |
| 75 | 80 | 10 | 10 | 14.0 | 4.5 | 4.1 |
| 76 | 50 | 30 | 20 | 14.4 | 5.8 | 5.4 |
| 77 | 60 | 20 | 20 | 14.4 | 5.7 | 5.3 |
| 78 | 70 | 10 | 20 | 14.3 | 5.6 | 5.2 |
| 79 | 60 | 10 | 30 | 14.6 | 6.4 | 6.1 |
| 80 | 50 | 20 | 30 | 14.7 | 6.6 | 6.2 |
| 81 | 40 | 30 | 30 | 14.7 | 6.7 | 6.3 |
| 82 | 40 | 5 | 55 | 15.1 | 7.9 | 7.6 |
| 83 | 40 | 15 | 45 | 15.0 | 7.5 | 7.2 |
| 84 | 40 | 25 | 35 | 14.8 | 7.0 | 6.6 |
| 85 | 45 | 5 | 50 | 15.0 | 7.6 | 7.3 |
| 86 | 45 | 10 | 45 | 15.0 | 7.4 | 7.1 |
| 87 | 45 | 15 | 40 | 14.9 | 7.2 | 6.8 |
| 88 | 45 | 20 | 35 | 14.8 | 6.9 | 6.6 |

TABLE 4

| Working fluid No. | Working fluid composition [mass %] | | | $\delta_D$ | $\delta_P$ | $\delta_H$ |
|---|---|---|---|---|---|---|
| | HFO-1123 | HFO-1234ze (Z, E) | HFC-32 | | | |
| 89 | 45 | 25 | 30 | 14.7 | 6.6 | 6.3 |
| 90 | 45 | 30 | 25 | 14.6 | 6.3 | 5.9 |
| 91 | 50 | 5 | 45 | 14.9 | 7.4 | 7.0 |
| 92 | 50 | 15 | 35 | 14.8 | 6.9 | 6.5 |
| 93 | 50 | 25 | 25 | 14.6 | 6.2 | 5.8 |
| 94 | 55 | 5 | 40 | 14.8 | 7.1 | 6.7 |
| 95 | 55 | 10 | 35 | 14.7 | 6.8 | 6.4 |
| 96 | 55 | 15 | 30 | 14.7 | 6.5 | 6.1 |
| 97 | 55 | 20 | 25 | 14.5 | 6.1 | 5.8 |
| 98 | 55 | 25 | 20 | 14.4 | 5.7 | 5.4 |

TABLE 4-continued

| Working fluid No. | Working fluid composition [mass %] | | | $\delta_D$ | $\delta_P$ | $\delta_H$ |
|---|---|---|---|---|---|---|
| | HFO-1123 | HFO-1234ze (Z, E) | HFC-32 | | | |
| 99 | 55 | 30 | 15 | 14.3 | 5.3 | 4.9 |
| 100 | 30 | 25 | 45 | 15.0 | 7.6 | 7.3 |
| 101 | 30 | 15 | 55 | 15.2 | 8.0 | 7.7 |
| 102 | 30 | 5 | 65 | 15.2 | 8.3 | 8.0 |
| 103 | 35 | 30 | 35 | 14.9 | 7.1 | 6.7 |
| 104 | 35 | 25 | 40 | 14.9 | 7.3 | 7.0 |
| 105 | 35 | 20 | 45 | 15.0 | 7.6 | 7.2 |
| 106 | 35 | 15 | 50 | 15.1 | 7.8 | 7.4 |
| 107 | 35 | 10 | 55 | 15.1 | 7.9 | 7.6 |
| 108 | 35 | 5 | 60 | 15.2 | 8.1 | 7.8 |
| 109 | 20 | 40 | 40 | 15.0 | 7.5 | 7.2 |
| 110 | 10 | 50 | 40 | 15.1 | 7.7 | 7.4 |
| 111 | 10 | 40 | 50 | 15.2 | 8.1 | 7.8 |
| 112 | 40 | 50 | 10 | 14.2 | 4.8 | 4.4 |
| 113 | 50 | 40 | 10 | 14.1 | 4.7 | 4.3 |
| 114 | 40 | 40 | 20 | 14.5 | 5.9 | 5.5 |
| 115 | 30 | 40 | 30 | 14.8 | 6.8 | 6.5 |

(Phosphoric Acid Ester)

HSP of the phosphoric acid esters shown in Table 5 were determined in the same manner as the above method. The symbols and the compound names for the phosphoric acid esters and HSP are shown in Table 5.

Further, the interaction distances (Ra) between the phosphoric acid esters (A to M) and the working fluids (Nos. 3 to 115) is shown in Tables 6 to 8.

TABLE 5

| | Phosphoric acid ester | | | |
|---|---|---|---|---|
| Symbol | Compound name | $\delta_D$ | $\delta_P$ | $\delta_H$ |
| A | Trimethyl phosphate | 15.7 | 10.5 | 10.2 |
| B | Triethyl phosphate | 16.7 | 11.4 | 9.2 |
| C | Tripropyl phosphate | 16.1 | 10 | 6.8 |
| D | Tributyl phosphate | 16.3 | 6.3 | 4.3 |
| E | Triphenyl phosphate | 20.1 | 6.4 | 6.8 |
| F | Tricresyl phosphate | 19 | 12.3 | 4.5 |
| G | Di-n-butyl acid phosphate | 17.4 | 9.9 | 14.7 |
| H | Di(2-ethylhexyl) acid phosphate | 16.9 | 6.9 | 11 |
| I | Octadecenyl acid phosphate | 17.6 | 8.1 | 17.3 |
| J | 4-Methylphenyl acid phosphate | 21.4 | 14.3 | 28.3 |
| K | Di(4-methylphenyl) acid phosphate | 20.2 | 10.3 | 14.6 |
| L | 4-Chlorophenyl acid phosphate | 22 | 15.3 | 28.9 |
| M | Di(4-chlorophenyl) acid phosphate | 21.2 | 11.8 | 15.1 |

TABLE 6

| Working fluid No. | Phosphoric acid ester | | | | | | | | | | | | |
|---|---|---|---|---|---|---|---|---|---|---|---|---|---|
| | A | B | C | D | E | F | G | H | I | J | K | L | M |
| 3 | 2.5 | 3.8 | 2.5 | 5.2 | 9.9 | 9.0 | 7.5 | 4.4 | 9.9 | 23.8 | 11.5 | 25.2 | 13.7 |
| 4 | 3.5 | 4.7 | 2.8 | 4.6 | 10.0 | 9.3 | 8.4 | 4.8 | 10.6 | 24.7 | 12.3 | 26.1 | 14.5 |
| 5 | 6.5 | 7.5 | 4.9 | 3.8 | 11.1 | 10.9 | 11.1 | 7.0 | 13.1 | 27.5 | 14.8 | 28.9 | 17.1 |
| 6 | 9.4 | 10.4 | 7.7 | 5.2 | 12.8 | 12.9 | 13.9 | 9.6 | 15.7 | 30.2 | 17.5 | 31.7 | 19.8 |
| 7 | 10.4 | 11.4 | 8.6 | 5.9 | 13.5 | 13.7 | 14.9 | 10.5 | 16.6 | 31.2 | 18.4 | 32.6 | 20.7 |
| 8 | 5.1 | 6.2 | 3.8 | 3.9 | 10.6 | 10.1 | 9.9 | 5.9 | 12.0 | 26.2 | 13.7 | 27.6 | 15.9 |
| 9 | 5.0 | 6.0 | 3.7 | 4.0 | 10.5 | 10.0 | 9.7 | 5.8 | 11.8 | 26.1 | 13.5 | 27.5 | 15.8 |
| 10 | 4.8 | 5.9 | 3.6 | 4.0 | 10.5 | 9.9 | 9.6 | 5.7 | 11.7 | 25.9 | 13.4 | 27.3 | 15.7 |
| 11 | 4.2 | 5.3 | 3.2 | 4.2 | 10.3 | 9.6 | 9.0 | 5.3 | 11.2 | 25.4 | 12.9 | 26.8 | 15.2 |
| 12 | 4.1 | 5.2 | 3.1 | 4.3 | 10.2 | 9.5 | 8.9 | 5.2 | 11.1 | 25.3 | 12.8 | 26.6 | 15.0 |
| 13 | 3.9 | 5.0 | 3.0 | 4.4 | 10.2 | 9.5 | 8.7 | 5.1 | 11.0 | 25.1 | 12.6 | 26.5 | 14.9 |
| 14 | 3.5 | 4.6 | 2.8 | 4.6 | 10.0 | 9.3 | 8.4 | 4.8 | 10.6 | 24.7 | 12.3 | 26.1 | 14.5 |
| 15 | 3.3 | 4.5 | 2.7 | 4.7 | 10.0 | 9.2 | 8.2 | 4.8 | 10.5 | 24.6 | 12.1 | 25.9 | 14.4 |
| 16 | 3.1 | 4.3 | 2.6 | 4.8 | 10.0 | 9.1 | 8.0 | 4.7 | 10.4 | 24.4 | 12.0 | 25.8 | 14.2 |
| 17 | 2.8 | 4.1 | 2.6 | 5.0 | 9.9 | 9.1 | 7.8 | 4.5 | 10.1 | 24.1 | 11.8 | 25.5 | 14.0 |
| 18 | 2.6 | 3.9 | 2.5 | 5.1 | 9.9 | 9.0 | 7.6 | 4.4 | 10.0 | 24.0 | 11.6 | 25.3 | 13.8 |
| 19 | 9.1 | 10.1 | 7.4 | 5.0 | 12.7 | 12.7 | 13.7 | 9.3 | 15.4 | 30.0 | 17.2 | 31.4 | 19.5 |
| 20 | 9.2 | 10.1 | 7.4 | 5.0 | 12.7 | 12.7 | 13.7 | 9.4 | 15.5 | 30.0 | 17.3 | 31.4 | 19.6 |
| 21 | 9.3 | 10.2 | 7.5 | 5.0 | 12.7 | 12.8 | 13.8 | 9.4 | 15.5 | 30.1 | 17.3 | 31.5 | 19.6 |
| 22 | 7.3 | 8.3 | 5.7 | 4.1 | 11.6 | 11.4 | 11.9 | 7.7 | 13.8 | 28.3 | 15.6 | 29.7 | 17.9 |
| 23 | 7.4 | 8.4 | 5.8 | 4.1 | 11.7 | 11.5 | 12.0 | 7.8 | 13.9 | 28.4 | 15.7 | 29.8 | 18.0 |
| 24 | 7.6 | 8.5 | 5.9 | 4.1 | 11.7 | 11.6 | 12.1 | 7.9 | 14.0 | 28.5 | 15.8 | 29.9 | 18.1 |
| 25 | 6.2 | 7.2 | 4.7 | 3.8 | 11.0 | 10.7 | 10.9 | 6.8 | 12.9 | 27.2 | 14.6 | 28.6 | 16.9 |
| 26 | 6.1 | 7.1 | 4.6 | 3.8 | 11.0 | 10.6 | 10.7 | 6.7 | 12.8 | 27.1 | 14.5 | 28.5 | 16.8 |
| 27 | 5.9 | 6.9 | 4.5 | 3.8 | 10.9 | 10.5 | 10.6 | 6.6 | 12.6 | 27.0 | 14.4 | 28.4 | 16.6 |
| 28 | 4.2 | 5.3 | 3.2 | 4.2 | 10.2 | 9.6 | 9.0 | 5.3 | 11.2 | 25.4 | 12.9 | 26.7 | 15.1 |
| 29 | 4.9 | 5.9 | 3.6 | 4.0 | 10.5 | 9.9 | 9.6 | 5.8 | 11.8 | 26.0 | 13.5 | 27.4 | 15.7 |
| 30 | 5.7 | 6.8 | 4.3 | 3.8 | 10.8 | 10.4 | 10.4 | 6.4 | 12.5 | 26.8 | 14.2 | 28.2 | 16.5 |
| 31 | 4.6 | 5.7 | 3.5 | 4.1 | 10.4 | 9.8 | 9.4 | 5.6 | 11.5 | 25.8 | 13.2 | 27.1 | 15.5 |
| 32 | 5.0 | 6.0 | 3.7 | 4.0 | 10.5 | 10.0 | 9.7 | 5.8 | 11.8 | 26.1 | 13.5 | 27.5 | 15.8 |
| 33 | 5.4 | 6.4 | 4.0 | 3.9 | 10.7 | 10.2 | 10.1 | 6.1 | 12.2 | 26.5 | 13.9 | 27.9 | 16.2 |
| 34 | 5.8 | 6.9 | 4.4 | 3.8 | 10.9 | 10.5 | 10.5 | 6.5 | 12.5 | 26.9 | 14.3 | 28.3 | 16.6 |
| 35 | 6.3 | 7.4 | 4.8 | 3.8 | 11.1 | 10.8 | 11.0 | 6.9 | 13.0 | 27.4 | 14.7 | 28.8 | 17.0 |
| 36 | 6.9 | 7.9 | 5.3 | 3.9 | 11.4 | 11.1 | 11.6 | 7.4 | 13.5 | 27.9 | 15.3 | 29.3 | 17.5 |
| 37 | 5.1 | 6.1 | 3.8 | 3.9 | 10.5 | 10.0 | 9.8 | 5.9 | 11.9 | 26.2 | 13.6 | 27.6 | 15.9 |
| 38 | 5.9 | 6.9 | 4.5 | 3.8 | 10.9 | 10.5 | 10.6 | 6.5 | 12.6 | 27.0 | 14.4 | 28.4 | 16.6 |
| 39 | 7.0 | 8.0 | 5.4 | 4.0 | 11.4 | 11.2 | 11.6 | 7.4 | 13.6 | 28.0 | 15.3 | 29.4 | 17.6 |
| 40 | 5.5 | 6.6 | 4.2 | 3.8 | 10.7 | 10.3 | 10.2 | 6.2 | 12.3 | 26.6 | 14.0 | 28.0 | 16.3 |
| 41 | 6.0 | 7.0 | 4.5 | 3.8 | 10.9 | 10.6 | 10.7 | 6.6 | 12.7 | 27.0 | 14.4 | 28.4 | 16.7 |
| 42 | 6.5 | 7.5 | 5.0 | 3.9 | 11.2 | 10.9 | 11.1 | 7.0 | 13.1 | 27.5 | 14.9 | 28.9 | 17.1 |
| 43 | 7.1 | 8.1 | 5.5 | 4.0 | 11.5 | 11.2 | 11.7 | 7.5 | 13.6 | 28.0 | 15.4 | 29.4 | 17.7 |
| 44 | 7.7 | 8.7 | 6.1 | 4.2 | 11.8 | 11.7 | 12.3 | 8.1 | 14.2 | 28.7 | 16.0 | 30.1 | 18.2 |
| 45 | 8.5 | 9.4 | 6.7 | 4.6 | 12.3 | 12.2 | 13.0 | 8.7 | 14.9 | 29.4 | 16.7 | 30.8 | 18.9 |

TABLE 7

| Working fluid No. | Phosphoric acid ester | | | | | | | | | | | | |
|---|---|---|---|---|---|---|---|---|---|---|---|---|---|
| | A | B | C | D | E | F | G | H | I | J | K | L | M |
| 46 | 4.7 | 5.8 | 3.5 | 4.0 | 10.4 | 9.8 | 9.5 | 5.6 | 11.6 | 25.8 | 13.3 | 27.2 | 15.6 |
| 47 | 4.0 | 5.1 | 3.1 | 4.3 | 10.2 | 9.5 | 8.8 | 5.2 | 11.0 | 25.2 | 12.7 | 26.6 | 15.0 |
| 48 | 3.4 | 4.6 | 2.8 | 4.6 | 10.0 | 9.3 | 8.3 | 4.8 | 10.6 | 24.7 | 12.3 | 26.1 | 14.5 |
| 49 | 5.7 | 6.7 | 4.2 | 3.8 | 10.8 | 10.4 | 10.4 | 6.4 | 12.4 | 26.7 | 14.2 | 28.1 | 16.4 |
| 50 | 5.2 | 6.2 | 3.9 | 3.9 | 10.6 | 10.1 | 9.9 | 6.0 | 12.0 | 26.3 | 13.7 | 27.7 | 16.0 |
| 51 | 4.8 | 5.9 | 3.6 | 4.0 | 10.5 | 9.9 | 9.6 | 5.7 | 11.7 | 25.9 | 13.4 | 27.3 | 15.6 |
| 52 | 4.4 | 5.5 | 3.3 | 4.1 | 10.3 | 9.7 | 9.2 | 5.4 | 11.4 | 25.6 | 13.1 | 27.0 | 15.3 |
| 53 | 4.1 | 5.2 | 3.1 | 4.3 | 10.2 | 9.6 | 8.9 | 5.2 | 11.1 | 25.3 | 12.8 | 26.7 | 15.0 |
| 54 | 3.8 | 4.9 | 3.0 | 4.4 | 10.1 | 9.4 | 8.6 | 5.0 | 10.9 | 25.0 | 12.6 | 26.4 | 14.8 |
| 55 | 4.9 | 6.0 | 3.6 | 4.0 | 10.5 | 9.9 | 9.7 | 5.8 | 11.8 | 26.1 | 13.5 | 27.4 | 15.8 |
| 56 | 4.7 | 5.8 | 3.5 | 4.1 | 10.5 | 9.8 | 9.5 | 5.7 | 11.7 | 25.9 | 13.3 | 27.3 | 15.6 |
| 57 | 3.9 | 5.0 | 3.0 | 4.4 | 10.2 | 9.5 | 8.8 | 5.2 | 11.0 | 25.1 | 12.7 | 26.5 | 14.9 |
| 58 | 9.3 | 10.2 | 7.5 | 5.1 | 12.8 | 12.8 | 13.8 | 9.5 | 15.6 | 30.1 | 17.4 | 31.6 | 19.7 |
| 59 | 9.3 | 10.3 | 7.5 | 5.1 | 12.8 | 12.8 | 13.9 | 9.5 | 15.6 | 30.2 | 17.4 | 31.6 | 19.7 |
| 60 | 7.5 | 8.5 | 5.9 | 4.1 | 11.7 | 11.5 | 12.2 | 7.9 | 14.0 | 28.5 | 15.8 | 29.9 | 18.1 |
| 61 | 6.1 | 7.1 | 4.6 | 3.8 | 11.0 | 10.6 | 10.8 | 6.7 | 12.8 | 27.2 | 14.5 | 28.5 | 16.8 |
| 62 | 5.1 | 6.1 | 3.8 | 3.9 | 10.5 | 10.0 | 9.8 | 5.9 | 11.9 | 26.2 | 13.6 | 27.6 | 15.9 |
| 63 | 4.9 | 5.9 | 3.6 | 3.9 | 10.4 | 9.9 | 9.6 | 5.7 | 11.7 | 26.0 | 13.4 | 27.4 | 15.7 |
| 64 | 4.7 | 5.7 | 3.5 | 4.0 | 10.3 | 9.8 | 9.4 | 5.5 | 11.5 | 25.8 | 13.2 | 27.2 | 15.5 |
| 65 | 4.2 | 5.3 | 3.2 | 4.2 | 10.2 | 9.6 | 9.0 | 5.3 | 11.2 | 25.4 | 12.9 | 26.7 | 15.1 |
| 66 | 4.0 | 5.1 | 3.0 | 4.3 | 10.1 | 9.5 | 8.8 | 5.1 | 11.0 | 25.2 | 12.7 | 26.5 | 14.9 |
| 67 | 3.7 | 4.9 | 2.9 | 4.4 | 10.0 | 9.4 | 8.6 | 5.0 | 10.8 | 24.9 | 12.5 | 26.3 | 14.7 |
| 68 | 3.4 | 4.6 | 2.8 | 4.6 | 10.0 | 9.3 | 8.3 | 4.8 | 10.6 | 24.7 | 12.2 | 26.0 | 14.5 |
| 69 | 3.2 | 4.4 | 2.7 | 4.7 | 9.9 | 9.2 | 8.1 | 4.7 | 10.4 | 24.5 | 12.1 | 25.8 | 14.3 |
| 70 | 3.0 | 4.2 | 2.6 | 4.8 | 9.9 | 9.1 | 7.9 | 4.5 | 10.2 | 24.3 | 11.9 | 25.6 | 14.1 |
| 71 | 2.8 | 4.0 | 2.5 | 5.0 | 9.9 | 9.0 | 7.7 | 4.5 | 10.1 | 24.1 | 11.7 | 25.5 | 13.9 |
| 72 | 2.6 | 3.8 | 2.5 | 5.1 | 9.8 | 8.9 | 7.6 | 4.4 | 9.9 | 23.9 | 11.5 | 25.2 | 13.7 |
| 73 | 8.9 | 9.9 | 7.2 | 4.7 | 12.4 | 12.5 | 13.4 | 9.1 | 15.2 | 29.8 | 17.0 | 31.2 | 19.3 |
| 74 | 9.1 | 10.0 | 7.3 | 4.9 | 12.6 | 12.6 | 13.6 | 9.2 | 15.3 | 29.9 | 17.1 | 31.3 | 19.4 |
| 75 | 9.2 | 10.1 | 7.4 | 5.0 | 12.7 | 12.7 | 13.7 | 9.3 | 15.5 | 30.0 | 17.3 | 31.4 | 19.5 |
| 76 | 7.2 | 8.1 | 5.5 | 3.9 | 11.4 | 11.2 | 11.7 | 7.5 | 13.6 | 28.1 | 15.4 | 29.5 | 17.7 |
| 77 | 7.3 | 8.3 | 5.7 | 4.0 | 11.5 | 11.4 | 11.9 | 7.7 | 13.8 | 28.3 | 15.6 | 29.7 | 17.8 |
| 78 | 7.5 | 8.5 | 5.9 | 4.1 | 11.7 | 11.5 | 12.1 | 7.8 | 14.0 | 28.4 | 15.7 | 29.8 | 18.0 |
| 79 | 6.2 | 7.2 | 4.7 | 3.8 | 11.0 | 10.7 | 10.8 | 6.7 | 12.8 | 27.2 | 14.6 | 28.6 | 16.8 |
| 80 | 6.0 | 7.0 | 4.5 | 3.8 | 10.9 | 10.5 | 10.6 | 6.5 | 12.6 | 27.0 | 14.4 | 28.4 | 16.6 |
| 81 | 5.8 | 6.8 | 4.3 | 3.7 | 10.7 | 10.4 | 10.4 | 6.4 | 12.5 | 26.8 | 14.2 | 28.2 | 16.4 |
| 82 | 3.9 | 5.0 | 3.0 | 4.3 | 10.1 | 9.5 | 8.7 | 5.1 | 11.0 | 25.1 | 12.6 | 26.5 | 14.9 |
| 83 | 4.5 | 5.6 | 3.4 | 4.1 | 10.3 | 9.7 | 9.3 | 5.5 | 11.4 | 25.7 | 13.1 | 27.0 | 15.4 |
| 84 | 5.3 | 6.3 | 3.9 | 3.8 | 10.6 | 10.1 | 10.0 | 6.0 | 12.1 | 26.4 | 13.8 | 27.8 | 16.0 |
| 85 | 4.3 | 5.4 | 3.3 | 4.2 | 10.3 | 9.7 | 9.1 | 5.3 | 11.3 | 25.5 | 13.0 | 26.8 | 15.2 |
| 86 | 4.6 | 5.7 | 3.5 | 4.0 | 10.4 | 9.8 | 9.4 | 5.5 | 11.5 | 25.8 | 13.2 | 27.1 | 15.5 |
| 87 | 5.0 | 6.0 | 3.7 | 3.9 | 10.5 | 10.0 | 9.7 | 5.8 | 11.8 | 26.1 | 13.5 | 27.5 | 15.8 |
| 88 | 5.4 | 6.4 | 4.0 | 3.8 | 10.6 | 10.2 | 10.1 | 6.1 | 12.2 | 26.5 | 13.9 | 27.9 | 16.1 |

TABLE 8

| Working fluid No. | Phosphoric acid ester | | | | | | | | | | | | |
|---|---|---|---|---|---|---|---|---|---|---|---|---|---|
| | A | B | C | D | E | F | G | H | I | J | K | L | M |
| 89 | 5.9 | 6.9 | 4.4 | 3.8 | 10.8 | 10.4 | 10.5 | 6.5 | 12.5 | 26.9 | 14.3 | 28.3 | 16.5 |
| 90 | 6.4 | 7.4 | 4.9 | 3.8 | 11.0 | 10.8 | 11.0 | 6.9 | 13.0 | 27.4 | 14.7 | 28.8 | 17.0 |
| 91 | 4.7 | 5.8 | 3.5 | 4.0 | 10.4 | 9.9 | 9.5 | 5.6 | 11.6 | 25.9 | 13.3 | 27.2 | 15.6 |
| 92 | 5.5 | 6.5 | 4.1 | 3.8 | 10.7 | 10.3 | 10.2 | 6.2 | 12.2 | 26.6 | 14.0 | 28.0 | 16.2 |
| 93 | 6.5 | 7.5 | 5.0 | 3.8 | 11.1 | 10.8 | 11.1 | 7.0 | 13.1 | 27.5 | 14.8 | 28.9 | 17.1 |
| 94 | 5.2 | 6.2 | 3.9 | 3.9 | 10.6 | 10.1 | 9.9 | 6.0 | 12.0 | 26.3 | 13.7 | 27.7 | 16.0 |
| 95 | 5.6 | 6.6 | 4.2 | 3.8 | 10.7 | 10.3 | 10.3 | 6.3 | 12.3 | 26.7 | 14.1 | 28.1 | 16.3 |
| 96 | 6.1 | 7.1 | 4.6 | 3.8 | 10.9 | 10.6 | 10.7 | 6.6 | 12.7 | 27.1 | 14.5 | 28.5 | 16.7 |
| 97 | 6.6 | 7.6 | 5.1 | 3.8 | 11.2 | 10.9 | 11.2 | 7.1 | 13.2 | 27.6 | 14.9 | 29.0 | 17.2 |
| 98 | 7.2 | 8.2 | 5.6 | 4.0 | 11.5 | 11.3 | 11.8 | 7.6 | 13.7 | 28.2 | 15.5 | 29.6 | 17.8 |
| 99 | 8.0 | 8.9 | 6.3 | 4.2 | 11.9 | 11.8 | 12.5 | 8.2 | 14.4 | 28.9 | 16.1 | 30.3 | 18.4 |
| 100 | 4.3 | 5.4 | 3.2 | 4.1 | 10.2 | 9.6 | 9.1 | 5.3 | 11.3 | 25.5 | 12.9 | 26.8 | 15.2 |
| 101 | 3.7 | 4.8 | 2.9 | 4.4 | 10.1 | 9.4 | 8.5 | 4.9 | 10.8 | 24.9 | 12.4 | 26.3 | 14.7 |
| 102 | 3.2 | 4.4 | 2.7 | 4.7 | 10.0 | 9.2 | 8.1 | 4.7 | 10.4 | 24.5 | 12.1 | 25.8 | 14.3 |
| 103 | 5.2 | 6.2 | 3.8 | 3.8 | 10.5 | 10.0 | 9.9 | 5.9 | 12.0 | 26.3 | 13.7 | 27.6 | 15.9 |
| 104 | 4.8 | 5.8 | 3.5 | 4.0 | 10.4 | 9.8 | 9.5 | 5.6 | 11.6 | 25.9 | 13.3 | 27.3 | 15.6 |
| 105 | 4.4 | 5.5 | 3.3 | 4.1 | 10.3 | 9.7 | 9.2 | 5.4 | 11.3 | 25.6 | 13.0 | 26.9 | 15.3 |
| 106 | 4.1 | 5.2 | 3.1 | 4.2 | 10.2 | 9.5 | 8.9 | 5.2 | 11.1 | 25.3 | 12.8 | 26.6 | 15.0 |
| 107 | 3.8 | 4.9 | 2.9 | 4.4 | 10.1 | 9.4 | 8.6 | 5.0 | 10.9 | 25.0 | 12.5 | 26.4 | 14.8 |
| 108 | 3.6 | 4.7 | 2.8 | 4.5 | 10.0 | 9.3 | 8.4 | 4.9 | 10.7 | 24.8 | 12.3 | 26.1 | 14.6 |
| 109 | 4.4 | 5.5 | 3.3 | 4.0 | 10.2 | 9.6 | 9.2 | 5.4 | 11.3 | 25.5 | 13.0 | 26.9 | 15.2 |
| 110 | 4.2 | 5.2 | 3.1 | 4.1 | 10.1 | 9.5 | 8.9 | 5.2 | 11.1 | 25.3 | 12.8 | 26.7 | 15.0 |
| 111 | 3.5 | 4.6 | 2.7 | 4.5 | 10.0 | 9.2 | 8.3 | 4.8 | 10.6 | 24.7 | 12.2 | 26.1 | 14.5 |

TABLE 8-continued

| Working fluid No. | Phosphoric acid ester | | | | | | | | | | | | |
|---|---|---|---|---|---|---|---|---|---|---|---|---|
| | A | B | C | D | E | F | G | H | I | J | K | L | M |
| 112 | 8.6 | 9.5 | 6.9 | 4.5 | 12.2 | 12.2 | 13.1 | 8.8 | 14.9 | 29.5 | 16.7 | 30.9 | 19.0 |
| 113 | 8.8 | 9.7 | 7.0 | 4.6 | 12.3 | 12.3 | 13.3 | 8.9 | 15.1 | 29.6 | 16.8 | 31.0 | 19.1 |
| 114 | 7.0 | 7.9 | 5.3 | 3.8 | 11.3 | 11.1 | 11.5 | 7.3 | 13.5 | 27.9 | 15.2 | 29.3 | 17.5 |
| 115 | 5.5 | 6.5 | 4.1 | 3.7 | 10.6 | 10.2 | 10.2 | 6.2 | 12.3 | 26.6 | 14.0 | 28.0 | 16.2 |

<Stability Test>

Example 1

In a 200 ml stainless steel pressure resistant container in which a 150 ml of glass tube was put, 50 g of a mixture of HFO-1123 and HFC-32 in a mass ratio of 50/50 as a working fluid, 50 g of polypropylene glycol (carbon/oxygen molar ratio of 2.7) having both terminals methyl-etherified as a lubricating oil, and 0.5 g (1 mass % based on the working fluid) of tributyl phosphate as a phosphoric acid ester were added. Further, air having an oxygen concentration adjusted to 18 vol % was put, and the container was closed. Then, the closed pressure resistant container was stored in a constant temperature chamber (perfect oven PHH-202, manufactured by ESPEC CORP.) at 175° C. for 14 days, and the acid content in the working fluid and the total acid number of the refrigerant oil were analyzed. The results are shown in Table 9.

Comparative Example 1

The acid content of the working fluid and the total acid number of the refrigerant oil were analyzed in the same manner as in Example 1 except that the phosphoric acid ester was not added. The acid content was 12 ppm by the HCl concentration.

(Measurement of Acid Content)

The acid content of the working fluid after the test was measured in accordance with JIS K1560 (1,1,1,2-tetrafluoroethane (HFC-134a)).

The pressure resistant container after the test was left at rest until its temperature became room temperature. 100 ml of pure water was respectively put into 4 absorption bottles, and the absorption bottles were connected in series by a capillary tube. The absorption bottles in which pure water was put connected to one another, were connected to the pressure resistant container at room temperature, and the valve of the pressure resistant reactor was gradually opened to introduce the refrigerant gas into the water in the absorption bottles, and the acid content contained in the refrigerant gas was extracted.

The water in the first absorption bottle and the water in the second absorption bottle after extraction were put together, one drop of an indicator (BTB: bromothymol blue) was added, and titration was conducted with a 1/100N NaOH alkali standard solution. Further, the water in the third absorption bottle and the water in the fourth absorption bottle were put together, and titration was conducted in the same manner as blank measurement. From the measured value and the blank value, the acid content contained in the refrigerant after the test was obtained as the HCl concentration. In Table 9, "×" represents an acid content exceeding 10 ppm, "Δ" represents an acid content of from 5 to 10 ppm, and "○" represents an acid content of less than 5 ppm.

(Analysis of Total Acid Number of Refrigerant Oil)

The total acid number of the refrigerant oil after recovery of the working fluid gas was measured as follows in accordance with a method disclosed in the method for analyzing total acid number in JIS K2211 (Refrigerant oils). The refrigerant oil remaining in the pressure resistant container after the test was weighed and dissolved in a toluene/isopropanol/water mixed solution, and neutralization titration was carried out with a 1/100N KOH/ethanol solution using p-naphtholbenzein as an indicator, and the total acid number (mg.KOH/g) of the refrigerant oil was measured from the titer.

In Table 9, "×" represents a total acid number exceeding 10 mg·KOH/g, "Δ" represents a total acid number of from 5 to 10 mg.KOH/g, and "○" represents a total acid number of less than 5 mg.KOH/g.

TABLE 9

| | Phosphoric acid ester | Acid content (HCl concentration) [ppm] | Total acid number [mg/gKOH] |
|---|---|---|---|
| Example 1 | Tributyl phosphate | ○ | ○ |
| Comparative Example 1 | Nil | × | × |

INDUSTRIAL APPLICABILITY

The composition for a heat cycle system and a heat cycle system employing the composition of the present invention are useful for a refrigerating apparatus (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

This application is a continuation of PCT Application No. PCT/JP2015/057902 filed on Mar. 17, 2015, which is based upon and claims the benefit of priority from Japanese Patent Application No. 2014-054590 filed on Mar. 18, 2014, Japanese Patent Application No. 2014-127746 filed on Jun. 20, 2014 and Japanese Patent Application No. 2014-148349 filed on Jul. 18, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump

What is claimed is:

1. A composition, comprising:
   a working fluid containing trifluoroethylene and difluoromethane, and
   a phosphoric acid ester,
   wherein an interaction distance Ra between the working fluid and the phosphoric acid ester as determined from Hansen solubility parameters of the working fluid and the phosphoric acid ester is less than 9.0.

2. The composition according to claim 1, wherein a content of the phosphoric acid ester is from 0.01 to 10 mass % based on a total mass of the working fluid.

3. The composition according to claim 1, wherein the phosphoric acid ester is a phosphoric acid triester, an acidic phosphoric acid monoester, or an acidic phosphoric acid diester.

4. The composition according to claim 3, wherein the phosphoric acid ester is the phosphoric acid triestes, which is a trialkyl phosphate or a triaryl phosphate.

5. The composition according to claim 3, wherein the phosphoric acid ester is the acidic phosphoric acid monoester, which is a monoalkyl acid phosphate or a monoaryl acid phosphate.

6. The composition according to claim 3, wherein the phosphoric acid ester is the acidic phosphoric acid diester, which is a dialkl acid phosphate or a diaryl acid phosphate.

7. The composition according to claim 1, wherein a mass ratio of trifluoroethylene to difluoromethane in the working fluid is from 1/99 to 99/1.

8. The composition according to claim 1, wherein the working fluid further contains at least one hydrofluoroolefin selected from the group consisting of 2,3,3,3-tetrafluoropropene and 1,3,3,3-tetrafluoropropene.

9. The composition according to claim 8, wherein
   the working fluid contains trifluoroethylene, difluoromethane, and 2,3,3,3-tetrafluoropropene, and
   proportions of trifluoroethlene difluoromethane, and 2,3,3,3-tetrafluoropropene based on a total mass of trifluoroethylene, difluoromethane, and 2,3,3,3-tetrailuoropropene are as follows:
   10 mass %≤trifluoroethylene<75 mass %,
   5 mass %≤odifluoromethane≤75 mass %, and
   0 mass %≤2,3,3,3-tetrafluoropropene≤50 mass %.

10. The composition according to claim 8, wherein
    the working fluid contains trifluoroethylene, difluoromethane, and 1,3,3,3-tetrafluoropropene, and
    proportions of trifluoroethylene, difluoromethane, and 1,3,3,3-tetrafluoropropene based on a total mass of trifluoroethylene, difluoromethane, and 1,3,3,3-tetrafluoropropene are as follows:
    10 mass %≤trifluoroethylene≤80 mass %,
    5 mass %≤difluoromethane≤80 mass %, and
    5 mass %≤1,3,3,3-tetrafluoropropene≤45 mass %.

11. A heat cycle system, comprising:
    the composition according to claim 1.

12. The heat cycle system according to claim 11, which is a refrigerating apparatus, an air-conditioning apparatus, a power generation system, a heat transport apparatus, or a secondary cooling machine.

* * * * *